(12) United States Patent
Chang et al.

(10) Patent No.: US 10,527,774 B2
(45) Date of Patent: Jan. 7, 2020

(54) OPTICAL FILM ASSEMBLY, BACKLIGHT MODULE AND DISPLAY DEVICE

(71) Applicant: Shenzhen China Star Optoelectronics Technology Co., Ltd., Shenzhen, Guangdong (CN)

(72) Inventors: Jianyu Chang, Guangdong (CN); Yung-jui Lee, Guangdong (CN); Yu-chun Hsiao, Guangdong (CN); Sheng-Jer Chang Chien, Guangdong (CN); Zanjia Su, Guangdong (CN); Bo Hai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 48 days.

(21) Appl. No.: 15/558,170

(22) PCT Filed: Jul. 17, 2017

(86) PCT No.: PCT/CN2017/093074
§ 371 (c)(1),
(2) Date: Sep. 13, 2017

(87) PCT Pub. No.: WO2018/201613
PCT Pub. Date: Nov. 8, 2018

(65) Prior Publication Data
US 2019/0004231 A1    Jan. 3, 2019

(30) Foreign Application Priority Data

May 4, 2017 (CN) .......................... 2017 1 0308722

(51) Int. Cl.
*G02F 1/1335* (2006.01)
*F21V 8/00* (2006.01)
*G02F 1/13357* (2006.01)

(52) U.S. Cl.
CPC .......... *G02B 6/005* (2013.01); *G02B 6/0051* (2013.01); *G02B 6/0053* (2013.01);
(Continued)

(58) Field of Classification Search
CPC .... G02B 6/005; G02B 6/0051; G02B 6/0053; G02B 6/0055
See application file for complete search history.

(56) References Cited

U.S. PATENT DOCUMENTS 8,033,706 B1 * 10/2011 Kelly .................. G02B 6/0036
362/307
2007/0057626 A1   3/2007 Kurihara
(Continued)

FOREIGN PATENT DOCUMENTS

CN     106501999 A    3/2017
CN     206848650 U    1/2018
(Continued)

*Primary Examiner* — Zheng Song
(74) *Attorney, Agent, or Firm* — Andrew C. Cheng

(57) ABSTRACT

The invention provides an optical film assembly, a backlight module, and a display device. The backlight module includes a light source emitting at least a first light, a first optical film, and a second optical film laminated to the first optical film, wherein the first optical film includes a base film and a functional layer stacking up to the base film, the functional layer is a diffusion film, a brightness enhancement film, a reflection film, or a prism film, the second optical film is a light conversion layer, the light conversion layer receives the first light and converts the first light to a second light to emit, such that a light emission angle of the backlight module matches a requirement of wide viewing angle. The invention could broaden the light emitting angle of the backlight module to make the display device with the backlight module achieve wide viewing angle.

16 Claims, 3 Drawing Sheets

(52) U.S. Cl.
CPC ..... *G02B 6/0055* (2013.01); *G02F 1/133606* (2013.01); *G02F 2001/133607* (2013.01); *G02F 2001/133614* (2013.01)

(56) References Cited

U.S. PATENT DOCUMENTS

| | | | | |
|---|---|---|---|---|
| 2012/0113672 | A1* | 5/2012 | Dubrow | B82Y 20/00 |
| | | | | 362/602 |
| 2013/0286679 | A1* | 10/2013 | Chen | G02B 6/0053 |
| | | | | 362/607 |
| 2014/0153217 | A1* | 6/2014 | Kang | G02B 5/23 |
| | | | | 362/84 |
| 2014/0192294 | A1* | 7/2014 | Chen | F21V 9/08 |
| | | | | 349/69 |
| 2017/0248809 | A1* | 8/2017 | Oba | G02B 6/005 |
| 2017/0317246 | A1* | 11/2017 | Kang | C08G 75/045 |
| 2018/0072942 | A1* | 3/2018 | Yamada | C09K 11/08 |
| 2018/0151817 | A1* | 5/2018 | Cho | G02B 6/005 |
| 2018/0246356 | A1* | 8/2018 | Lin | G02B 5/3041 |

FOREIGN PATENT DOCUMENTS

| | | | |
|---|---|---|---|
| JP | WO2015025950 A1 | 2/2015 | |
| JP | 20170021295 A | 1/2017 | |
| JP | 20170045652 A | 3/2017 | |

\* cited by examiner

OPTICAL FILM ASSEMBLY, BACKLIGHT MODULE AND DISPLAY DEVICE

BACKGROUND

Technical Field

The present invention relates to the technical field of liquid crystal display, and in particular to an optical film assembly, a backlight module, and a display device.

Description of the Related Art

Liquid crystal displays (LCD) has a small size, low power consumption, no radiation and other characteristics, has dominated the field of flat panel display. In recent years, LCD devices have been widely used such as high definition televisions, computers, laptops, mobile phones, and digital cameras and so on.

The inventors of the present invention in a long-term research and development have found that the lights is directional after the backlight passed the polarizer, the TFT, and so on, wherein the most of lights vertically emit from the screen. In other words, the image would have different colors when it is watched in different positions from the liquid crystal display. The image could not display the original color in particular when it is watched from a large viewing angle, the color of the image may be completely black or white. That is lack of wide viewing angle. As the size of LCD increases, the possibility of laterally watching the screen also increases. Therefore, the display device with wide viewing angle is needed.

SUMMARY

In order to solve the above problems, the present invention provides an optical film assembly, backlight module and display device can improve the viewing angle of the display device to achieve a better display quality.

In order to solve the above problems, the present invention provides an optical film assembly, including: a first optical film and a second optical film laminated to the first optical film. The first optical film includes a functional layer and the second optical film is a light conversion layer. The light conversion layer receives a first light and converts the first light to at least a second light to emit. The light conversion layer includes a quantum dot material and/or a phosphor material, and a concentration of the quantum dot material and/or the phosphor material in the light conversion layer ranges from 0.2% to 25% and a film thickness of the quantum dot material and/or the phosphor material ranges from 70 μm to 135 μm.

In order to solve the above problems, the present invention provides a backlight module, including: a light source emitting at least a first light, a first optical film, and a second optical film laminated to the first optical film. The first optical film includes a base film and a functional layer stacking up to the base film, the functional layer is a diffusion film, a brightness enhancement film, a reflection film, or a prism film. The second optical film is a light conversion layer. The light conversion layer receives the first light and converts the first light to at least a second light to emit, such that a light emission angle of the backlight module matches a requirement of wide viewing angle.

In order to solve the above problems, the present invention provides a display device includes the above-mentioned backlight module.

The advantages of the present invention are: the situation is different from the prior art, the present invention provides a backlight module, including: a light source emitting at least a first light, a first optical film, and a second optical film laminated to the first optical film. The second optical film is a light conversion layer. The light conversion layer could enhance the light scattering to increase the light emission angle of the backlight module, such that the display device with the backlight module could achieve the wide viewing angle.

DETAILED DESCRIPTION

To provide a thorough understanding of the purposes, technical solutions, and advantages of the present invention, the present invention will be further described in detail with the accompanying drawings and the embodiments.

Figure 1:
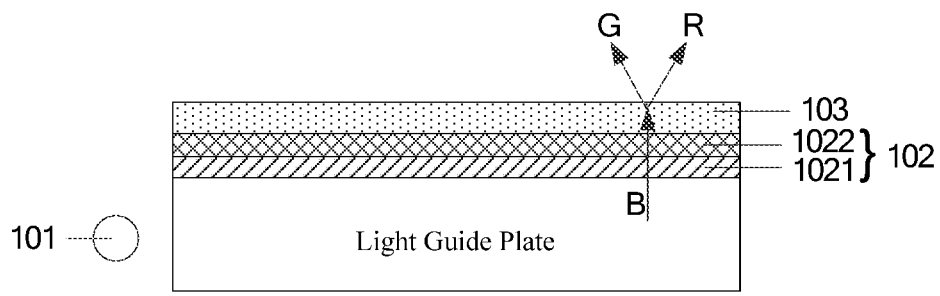
FIG. 1 is a schematic structural view of a backlight module in accordance with an embodiment of the present invention.
Figure 2:
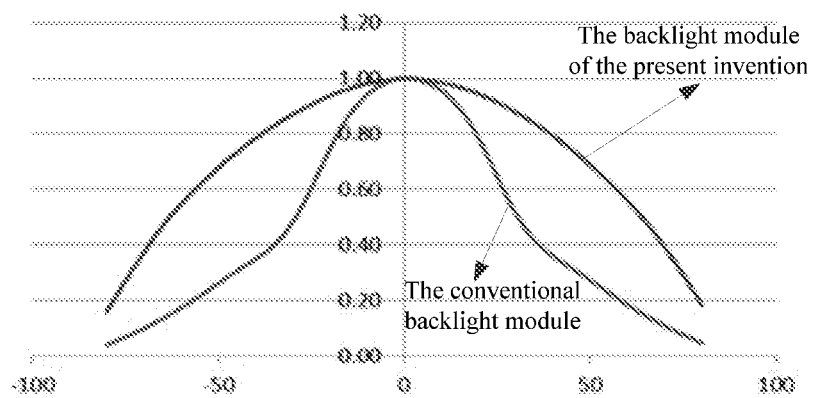
FIG. 2 is a comparison table of brightness and viewing angle between a conventional backlight module and a backlight module in accordance with an embodiment of the present invention.

Referring to FIG. 1 and FIG. 2. FIG. 1 a schematic structural view of a backlight module in accordance with an embodiment of the present invention. FIG. 2 is a comparison table of brightness and viewing angle between a conventional backlight module and a backlight module in accordance with an embodiment of the present invention. The present invention provides a backlight module to provide a backlight source of the display device. The backlight module includes a light source 101, a first optical film 102, and a second optical film 103.

The light source 101 could be a point light source, a linear light source, or an area light source able to emit at least a first light. The light source 101 may include a light emitting diode (LED). The light emitting diode could emit a plurality of color lights, such as ultraviolet light or blue light. In some embodiments, the light source 101 also could be other emitting chip, etc.

The second optical film 103 is laminated to the first optical film 102. The first optical film 102 includes a base film 1021 and a functional layer 1022 stacking up to the base film 1021. The base film 1021 is a carrier used for carrying or supporting the functional layer 1022 and the base film 1021 may include a glass material or an organic polymer material. The functional layer 1022 may be a diffusion film, a brightness enhancement film, a reflection film, or a prism film, and the functional layer 1022 may be between the base film 1021 and the second optical film 103. The second optical film 103 may be a light conversion layer, and the light conversion layer receives the first light and converts the first light to a second light to emit, such that a light emission angle of the backlight module matches a requirement of wide viewing angle. After the first light passed the light conversion layer and be converted to scatter, the light emission angle of the backlight module could match the wide viewing angle which is greater than 120°, such as 120°, 150°, or 170° and so on. In this way, the backlight module could meet the requirement of wide viewing angle, such that the display device with the backlight module could achieve the effect of wide viewing angle. The backlight module further includes a light guide plate, and the light guide plate is in direct contact with the base film 1021 of the first optical film 102.

The light conversion layer may include a light conversion material, and a concentration of the light conversion material in the light conversion layer may range from 0.2% to 25%, wherein the concentration may be weight percent concentration or volume percent concentration. The concentration may be modulated according to the texture, the density, the diameter and the matrix material, eta. In some embodiments, the concentration also could be weight percent concentration or volume percent concentration. As the concentration of the light conversion material increases, the color temperature of the backlight module decreases. Therefore, in order to decrease the color temperature of the backlight module, the concentration of the light conversion material could appropriately increases, such as 0.2%, 1%, 6%, 13%, or 25% and so on, so that the color temperature of the backlight module could be under 16000, such as 14000, 11000, 9000, or 7000, etc.

Selectively, in some embodiments, the present invention provides the backlight module with wide viewing angle and low color temperature, the contrast ratio could be greater than 1500:1 in the meanwhile, such as 1500:1, 3000:1, or 5000:1, etc.

Selectively, the first light may be an ultraviolet light or a blue light, the second light may be a yellow light, a mix light of green light and red light, or a mix light of blue light, green light and red light.

The light conversion layer may convert the first light to the second light with the same wavelength or different wavelength to emit. Specifically, when the first light is a blue light, the light conversion layer receive the blue light to stimulate a mix light of green light and red light with different wavelength as the second light to emit, or the light conversion layer receive the blue light to stimulate a yellow light with the same wavelength as the second light to emit. When the first light is a ultraviolet light, the light conversion layer receive the ultraviolet light to stimulate a mix light of blue light, green light and red light with different wavelength as the second light to emit. The light emission angle of the backlight module is increased by the light conversion layer enhancing the light scattering, such that the display device with the backlight module could achieve the wide viewing angle.

Selectively, in some embodiments, the light conversion layer may include a light conversion material, and a film thickness of the light conversion material may range from 70 μm to 135 μm, such as 75 μm, 95 μm, 115 μm, or 135 μm. If the film thickness of the light conversion material is too thick, the consumption and the loss of the light will be increased. Meanwhile, as the film thickness of the light conversion material increases, the color temperature of the backlight module will decrease, so in order to decrease the color temperature of the backlight module, the film thickness of the light conversion material could be increased.

Selectively, the light conversion layer includes a quantum dot material and/or a phosphor material. The quantum dot (QD) is a particle material with 3-dimension diameters all in nanometer. When the quantum dot receive the light, the quantum dot could be in the excited state and emits a light with a specific wavelength (i.e. specific color) as from the excited state back to the ground state. The emission spectrum is according to the diameter of the quantum dot, so the emission spectrum could be adjusted by changing the diameter of the quantum dot. In the same time, the converting efficiency of the quantum dot is high, so the utilizable efficiency of the light could be increased. The full width at half maximum of the emission spectrum of the quantum dot is narrow, and the temperature stability of the quantum dot is good. The quantum dot material may include II-VI group quantum dot material, I-III-VI group quantum dot material, or a mixture of different quantum dot materials. Specifically, the quantum dot material may include one or more of $ZnCdSe2$, $CdSe$, $CdTe$, $CuInS2$, and $ZnCuInS3$. The size, texture, and types of phosphor material of the quantum dot material could be selectively modulated according to the needs.

Selectively, in some embodiments, a ratio of the quantum dot material to the phosphor material may range from 1:100 to 1:5, such as 1:100, 1:70, 1:40, 1:20, or 1:5, etc. the converting efficiency of the quantum dot material is higher than that of the phosphor material, but the price of the quantum dot material is higher than that of the phosphor material. If the whole light conversion layer all selected the quantum dot material, the manufacturing cost will increase, and as the converting efficiency achieve a fixed value, even the quantity of the quantum dot material increases, the effects of the display quality is not great, so the resources will be wasted. Therefore, in this embodiment, the combination of the quantum dot material and the phosphor material could keep the converting efficiency and economize the manufacturing cost.

Selectively, in some embodiments, the diameter of quantum dot material may range from 1 nm to 20 nm, such as 1 nm, 5 nm, 8 nm, 15 nm, or 20 nm, etc. The quantum dot material may include a blue quantum dot material, a green quantum dot material, and red quantum dot material. When using non blue light e.g. the ultraviolet light as the light source, a concentration of the blue quantum dot material in the quantum dot material may range from 40% to 65%, such as 40%, 45%, 50%, 55%, 65%, etc; a concentration of the green quantum dot material in the quantum dot material may range from 15% to 45%, such as 15%, 25%, 35%, 40%, 45%, etc; a concentration of the red quantum dot material in the quantum dot material may range from 12% to 28%, such as 12%, 15%, 18%, 22%, 28%, etc. A concentration ratio of the green quantum dot material to the red quantum dot material may range from 3:1 to 1.2:1, such as 3:1, 2.5:1, 2:1, or 1.5:1, etc. When using blue light as the light source, the quantum dot material may not include the blue quantum dot material, and the green quantum dot material and the red quantum dot material could be modulated according to the above-mentioned ratios. In particular, the diameter of the quantum dot material would be well-distributed to increase the light purity. The blue quantum dot material is used for absorbing the first light and converting the first light to the second light to emit, such as green light and red light, so the content is much more. Furthermore, the green light is easy to be absorbed and converted to the red light, in order to uniform the white light to emit, the content of the green quantum dot material is more than that of the red quantum dot material, such that the ratios of the three lights to the white light respectively are: the blue light may range from 10% to 30%, the green light may range from 30% to 70%, and the red light may range from 20% to 40%.

Selectively, in some embodiments, the functional layer 1022 of the first optical film 102 is the reflection film disposed on a side of the light conversion film away from the light source 101 in a light path. A portion of the first light passes the light conversion film and emits to the reflection film, and is partially reflected to keep converting the first light to the second light. A portion of light could be scattered to emit and another portion of light could be reflected to stimulate for the emission by disposing the reflection film. In this way, the utilizable efficiency of the light could be increased and the brightness could be enhanced, such that the display quality could be better.

Selectively, besides the reflection film, other functional layer such as a diffusion film, a brightness enhancement film, or a prism film may be disposed on a side away from the second optical film 103 in the light path. Because the first optical film 102 is laminated to the second optical film 103, the light passed the second optical film 103 but not be converted has a chance to be reflected to keep converting. In order to increase the extent of the light converting.

Selectively, in some embodiments, the backlight module may further include a prism sheet disposed on a side of the light conversion film away from the light source 101 in the light path. The prism sheet is used for gathering the light only in the vertical viewing angle. In this way, the viewing angle in the horizontal direction is increased and the brightness is enhanced to achieve the better display quality.

Selectively, in some embodiments, the backlight module may further include a brightness enhancement sheet disposed on a side of the light conversion film away from the light source 101 in the light path. The brightness enhancement sheet is used for transmitting a polarized light and reflecting another polarized light. The reflected polarized light could back to the second optical film 103 to keep converting. In this way, the utilizable efficiency of the light could be increased and the brightness could be enhanced, such that the display quality could be better.

Selectively, in some embodiments, the backlight module may include the prism sheet and the brightness enhancement sheet in the same time. The backlight module could also include only one of the prism sheet and the brightness enhancement sheet.

Certainly, in some embodiments, a side of the light converting film away from the light source 101 in the light path may not dispose any prism sheet to avoid affecting the characteristic of the light converting film. Similarly, because the effects of gathering light of the prism sheet would be affected by the light converting film, a side of the light converting film adjacent to the light source 101 in the light path may not dispose any prism sheet.

Figure 3:
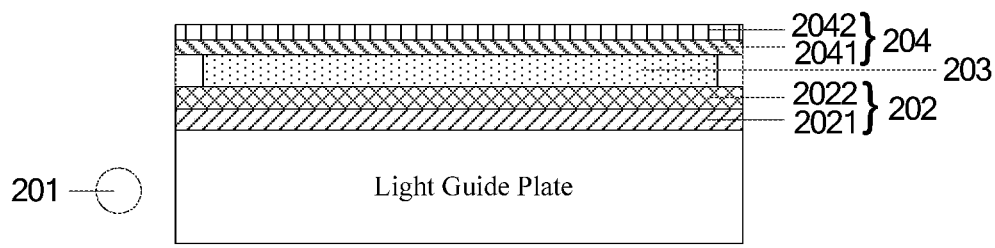
FIG. 3 is a schematic structural view of a backlight module in accordance with another embodiment of the present invention.

Referring to FIG. 3. FIG. 3 is a schematic structural view of a backlight module in accordance with another embodiment of the present invention. In some embodiments, the backlight module may further include a third optical film 204 laminated to a side of the second optical film 203 opposite to the first optical film 202. The third optical film 204 includes a base film 2041 and a functional layer 2042 stacking up to the base film 2041. The base film 2041 is a carrier used for carrying or supporting the functional layer 2042. The functional layer 2042 may be at least one of diffusion film, brightness enhancement film, reflection film, and prism film. In another embodiment, the second optical film 203 is completely wrapped by the first optical film 202 and the third optical film 204. The functional layer of the first optical film 202 and the functional layer of the third optical film 204 may be the same or different. Because the light converting film is easily failed during the operation due to the sensitivity to the vapor and the oxygen. In order to protect the light converting film, another two optical films completely wrap and seal up the light converting film. In this way, a protection layer is not required, so that manufacturing cost will decrease and the manufacturing process will be simplified.

Figure 4:
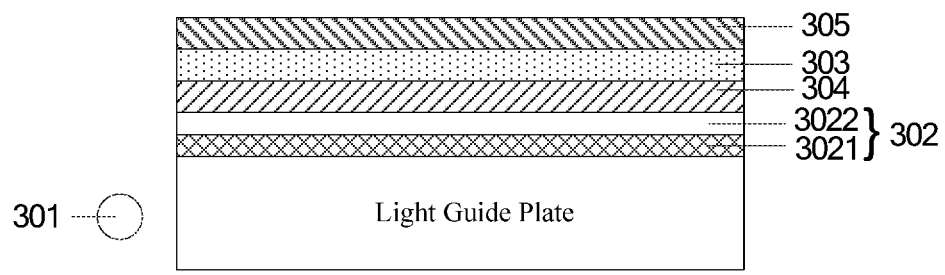
FIG. 4 is a schematic structural view of a backlight module in accordance with another embodiment of the present invention.
Figure 5:
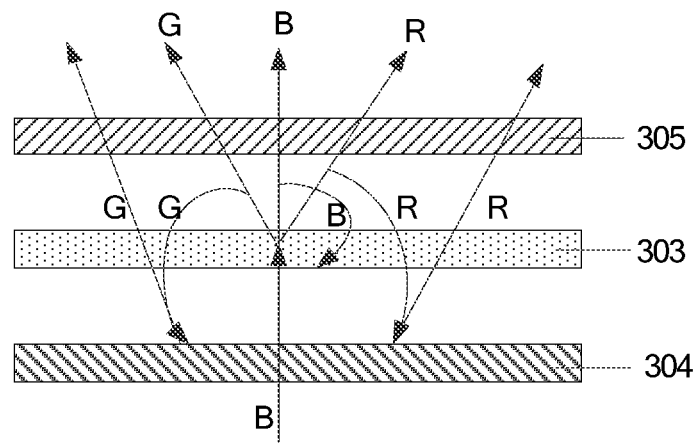
FIG. 5 is a schematic diagram of the light directions in a backlight module in accordance with another embodiment of the present invention.

Referring to FIG. 4 and FIG. 5. FIG. 4 is a schematic structural view of a backlight module in accordance with another embodiment of the present invention. FIG. 5 is a schematic diagram of the light directions in a backlight module in accordance with another embodiment of the present invention. In some embodiments, the backlight module may further include a first transflective film 304 disposed on a side of the light conversion film adjacent to the light source 101 in the light path. The first transflective film 304 is used for transmitting the first light and reflecting the other light expect for the first light. The backlight module may further include a second transflective film 305 disposed on a side of the light conversion film away from the light source 101 in the light path. The second transflective film 305 is used for reflecting a portion of the first light and transmitting the other light expect for the first light. The first transflective film could selectively transmit the first light to increase the purity of the first light, so that the stimulating efficiency could be enhanced. The second transflective film could transmit the other light expect for the first light to form the white light as backlight source, and could reflect a portion of the first light to convert to the second light, so that the utilizable efficiency of the first light could be increased and the brightness could be enhanced. In another embodiment, the transflective film could be only disposed on a side of the light conversion film away from the light source.

Take the blue light as an example, the first transflective film 304 could transmit the blue light and reflect the other light expect for the blue light. The blue light passed the light conversion film to be absorbed and stimulated to generate the red light and the green light. The red light, the green light and a portion of the blue light could pass the second transflective film 305 to generate the white light as the backlight source. A portion of the red light and the green light which could not pass the first transflective film 304 will be reflected and emit again to increase the utilizable efficiency of the light. Meanwhile, a portion of the blue light which be reflected will be absorbed by the light converting material and be stimulated again to increase the number of times of stimulating and the utilizable efficiency of the light.

Selectively, in some embodiments, the backlight module may be direct light source as the backlight source of the display device.

Figure 6:
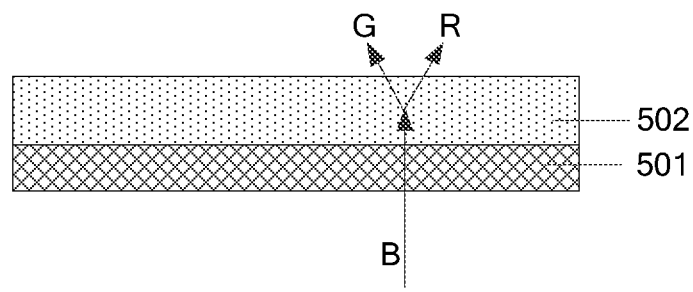
FIG. 6 is a schematic structural view of an optical film assembly in accordance with an embodiment of the present invention.

Referring to FIG. 6. FIG. 6 is a schematic structural view of an optical film assembly in accordance with an embodiment of the present invention. The present invention provides an optical film assembly. The optical film assembly may include a first optical film 501 and a second optical film 502 laminated to the first optical film 501. The first optical film 501 includes a functional layer and the second optical film 502 is a light conversion layer, and the light conversion layer receives a first light and converts the first light to a second light to emit. The functional layer is a diffusion film, a brightness enhancement film, a reflection film, or a prism film. The optical film assembly could be used in the above-mentioned backlight module, the characteristics and the effects are the same with the above-mentioned embodiments, and details are not repeated herein. The optical film assembly could be applied in other fields.

Figure 7:
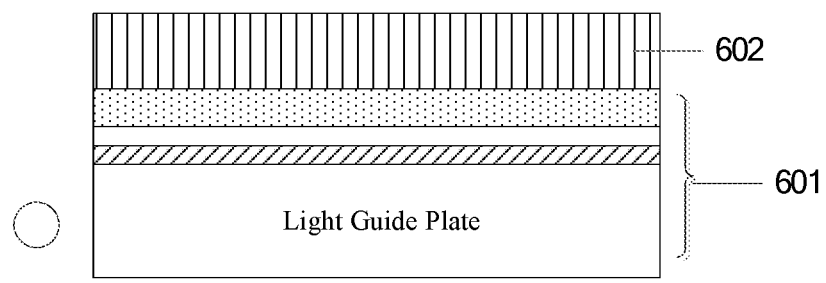
FIG. 7 is a schematic structural view of a display device in accordance with an embodiment of the present invention.

Referring to FIG. 7. FIG. 7 is a schematic structural view of a display device in accordance with an embodiment of the present invention. The present invention provides a display device. The display device may include a backlight module 601 and a liquid crystal display panel 602. The structure of the backlight module 601 is the same with the above-mentioned embodiments, and details are not repeated herein. The liquid crystal display panel 602 may select the regular structure. The backlight module of the display device is with a larger light emission angle, such that the display device could have a wider viewing angle and the display quality could be better.

In summary, the present invention provides a backlight module. The backlight module may include a first optical film and a second optical film laminated to the first optical film. The second optical film is a light conversion layer. The light conversion layer could enhance the light scattering to increase the light emission angle of the backlight module, such that the display device with the backlight module could achieve the wide viewing angle.

It should be noted that the foregoing embodiments are merely provided for describing the technical solutions of the present invention, but not intended to limit the present invention. It should be understood by persons skilled in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A backlight module, comprising:
a light source, emitting at least a first light;
a first optical film; and
a second optical film, laminated to the first optical film;
wherein the first optical film comprises a functional layer and the second optical film is a light conversion layer, the light conversion layer receives a first light and converts the first light to at least a second light to emit, the light conversion layer comprises a quantum dot material and a phosphor material, a concentration of the quantum dot material and the phosphor material in the light conversion layer ranges from 0.2% to 25%, a film thickness of the quantum dot material and the phosphor material ranges from 70 μm to 135 μm, and a ratio of the quantum dot material to the phosphor material ranges from 1:100 to 1:5;
wherein the light source is a non-blue light source, the quantum dot material comprises a blue quantum dot material, a green quantum dot material, and red quantum dot material, a concentration of the blue quantum dot material in the quantum dot material ranges from 40% to 65%, a concentration of the green quantum dot material in the quantum dot material ranges from 15% to 45%, a concentration of the red quantum dot material in the quantum dot material ranges from 5% to 30%, and a concentration ratio of the green quantum dot material to the red quantum dot material ranges from 3:1 to 1.5:1.

2. The optical film assembly of claim 1, wherein the functional layer is a diffusion film, a brightness enhancement film, a reflection film, or a prism film.

3. The backlight module of claim 1, wherein white lights are emitted from the backlight module; the white lights comprise blue lights, green lights, and red lights; a ratio of the blue lights to the white lights ranges from 10% to 30%, a ratio of the green lights to the white lights ranges from 30% to 70%, and a ratio of the red lights to the white lights ranges from 20% to 40%.

4. A backlight module, comprising:
a light source, emitting at least a first light;
a first optical film; and
a second optical film, laminated to the first optical film;
wherein the first optical film comprises a base film and a functional layer stacking up to the base film, the functional layer is a diffusion film, a brightness enhancement film, a reflection film, or a prism film, the second optical film is a light conversion layer, the light conversion layer comprises a quantum dot material and a phosphor material, a concentration of the quantum dot material and the phosphor material in the light conversion layer ranges from 0.2% to 25%, a film thickness of the quantum dot material and the phosphor material ranges from 70 μm to 135 μm, a diameter of quantum dot material ranges from 1 nm to 20 nm, and a ratio of the quantum dot material to the phosphor material ranges from 1:100 to 1:5; and the light conversion layer receives the first light and converts the first light to at least a second light to emit;
wherein the light source is a non-blue light source, the quantum dot material comprises a blue quantum dot material, a green quantum dot material, and red quantum dot material, a concentration of the blue quantum dot material in the quantum dot material ranges from 40% to 65%, a concentration of the green quantum dot material in the quantum dot material ranges from 15% to 45%, a concentration of the red quantum dot material in the quantum dot material ranges from 5% to 30%, and a concentration ratio of the green quantum dot material to the red quantum dot material ranges from 3:1 to 1.5:1.

5. The backlight module of claim 4, wherein a color temperature of a backlight is smaller than 16000 Kelvin, and a contrast ratio of the backlight is greater than 1500:1.

6. The backlight module of claim 4, wherein the backlight module further comprises a third optical film, the third optical film is laminated to a side of the second optical film opposite to the first optical film.

7. The backlight module of claim 6, wherein the second optical film is completely wrapped by the first optical film and the third optical film.

8. The backlight module of claim 4, wherein the functional layer of the first optical film is a reflection film, disposed on a side of the light conversion layer away from the light source in a light path, a portion of the first light passes the light conversion layer and emits to the reflection film, and is partially reflected to keep converting the first light to the second light.

9. The backlight module of claim 4, wherein the backlight module further comprises:
a first transflective film, disposed on a side of the light conversion layer adjacent to the light source in a light path, transmitting the first light and reflecting the other light expect for the first light; and
a second transflective film, disposed on a side of the light conversion layer away from the light source in the light path, reflecting at least a portion of the first light and transmitting the other light expect for the first light.

10. The backlight module of claim 4, wherein the backlight module further comprises:
a prism sheet, disposed on a side of the light conversion layer away from the light source in a light path, gathering the light only in the vertical viewing angle; and/or
a brightness enhancement sheet, disposed on a side of the light conversion layer away from the light source in the light path, transmitting a polarized light and reflecting another polarized light.

11. The backlight module of claim 4, wherein the backlight module further comprises a light guide plate, and the light guide plate is in direct contact with the base film of the first optical film.

12. The backlight module of claim 4, wherein white lights are emitted from the backlight module; the white lights comprise blue lights, green lights, and red lights; a ratio of the blue lights to the white lights ranges from 10% to 30%, a ratio of the green lights to the white lights ranges from 30% to 70%, and a ratio of the red lights to the white lights ranges from 20% to 40%.

13. A display device, comprising a backlight module, wherein the backlight module comprises:
a light source, emitting at least a first light;
a first optical film;
a second optical film, laminated to the first optical film;
wherein the first optical film comprises a base film and a functional layer stacking up to the base film, the functional layer is a diffusion film, a brightness enhancement film, a reflection film, or a prism film, the second optical film is a light conversion layer, the light conversion layer comprises a quantum dot material and a phosphor material, a concentration of the quantum dot material and the phosphor material in the light conversion layer ranges from 0.2% to 25%, and a film thickness of the quantum dot material and the phosphor material ranges from 70 μm to 135 μm; the light conversion layer receives the first light and converts the first light to at least a second light to emit;
a first transflective film, disposed on a side of the light conversion layer adjacent to the light source in a light path, transmitting the first light and reflecting the other light expect for the first light; and
a second transflective film, disposed on a side of the light conversion layer away from the light source in the light path, reflecting at least a portion of the first light and transmitting the other light expect for the first light;
wherein the light source is a non-blue light source, the quantum dot material comprises a blue quantum dot material, a green quantum dot material, and red quantum dot material, a concentration of the blue quantum dot material in the quantum dot material ranges from 40% to 65%, a concentration of the green quantum dot material in the quantum dot material ranges from 15% to 45%, a concentration of the red quantum dot material in the quantum dot material ranges from 5% to 30%, and a concentration ratio of the green quantum dot material to the red quantum dot material ranges from 3:1 to 1.5:1.

14. The display device of claim 13, wherein a color temperature of the requirement of wide viewing angle is smaller than 16000, and a contrast ratio of the requirement of wide viewing angle is greater than 1500:1.

15. The display device of claim 13, wherein the backlight module further comprises:
a prism sheet, disposed on a side of the light conversion layer away from the light source in a light path, gathering the light only in the vertical viewing angle; and/or
a brightness enhancement sheet, disposed on a side of the light conversion layer away from the light source in the light path, transmitting a polarized light and reflecting another polarized light.

16. The display device of claim 13, wherein the backlight module further comprises a light guide plate, and the light guide plate is in direct contact with the base film of the first optical film.

* * * * *